April 27, 1943.                 R. H. PETERSON                 2,317,553
                                  POWER SHEAR
                              Filed Dec. 12, 1941            2 Sheets-Sheet 1
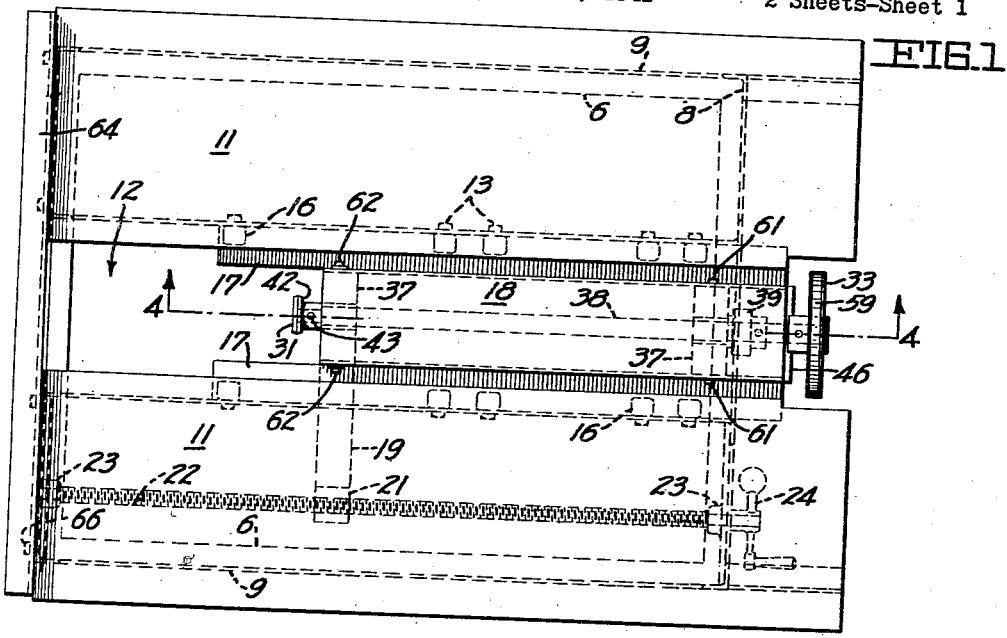
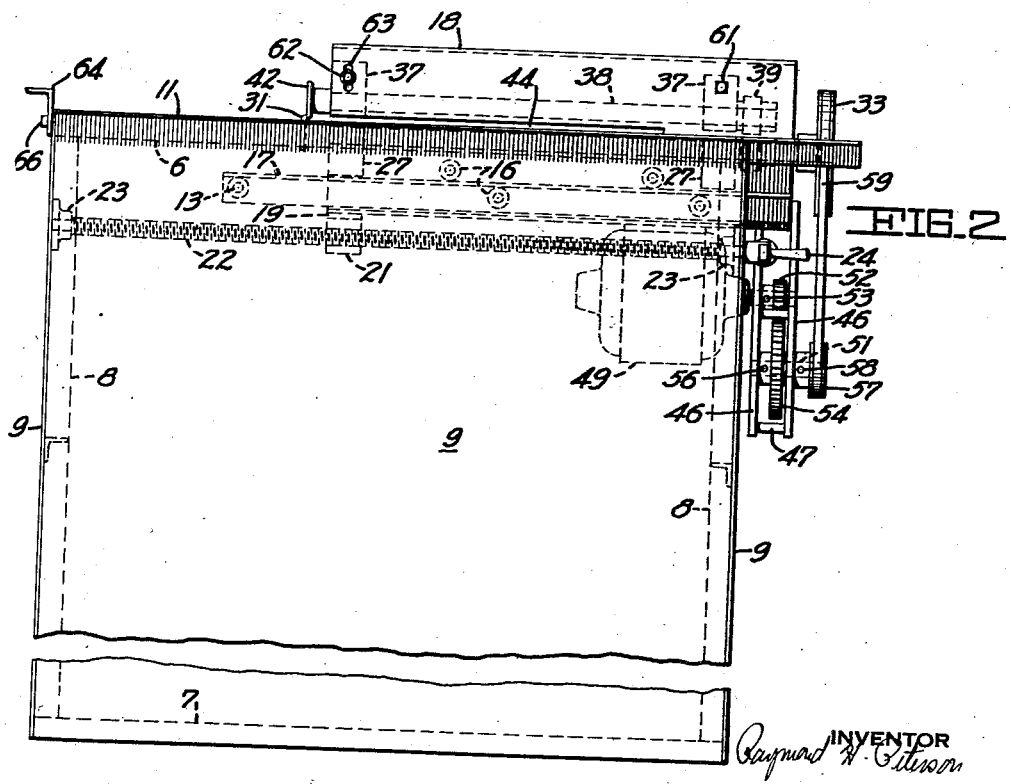
INVENTOR
Raymond H. Peterson
BY
Harry C. Schroeder April 27, 1943.                R. H. PETERSON                 2,317,553
                                 POWER SHEAR
                              Filed Dec. 12, 1941              2 Sheets-Sheet 2
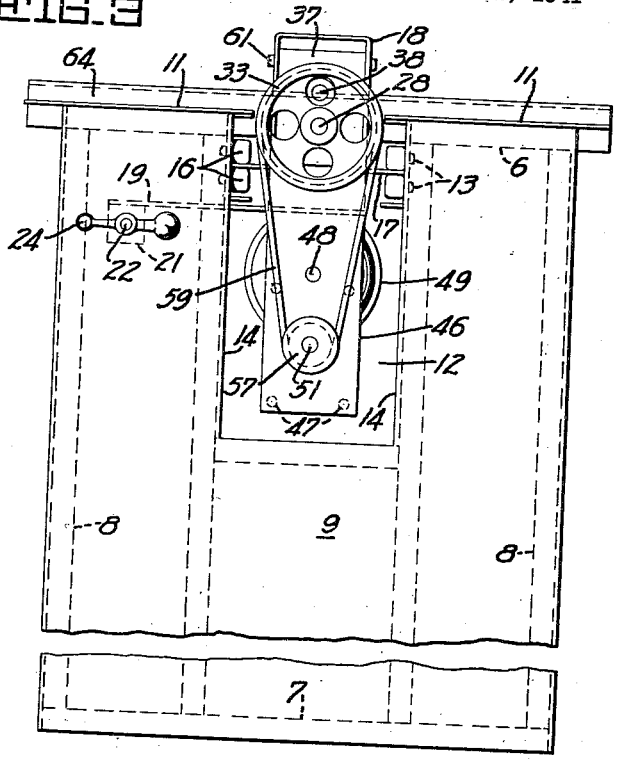
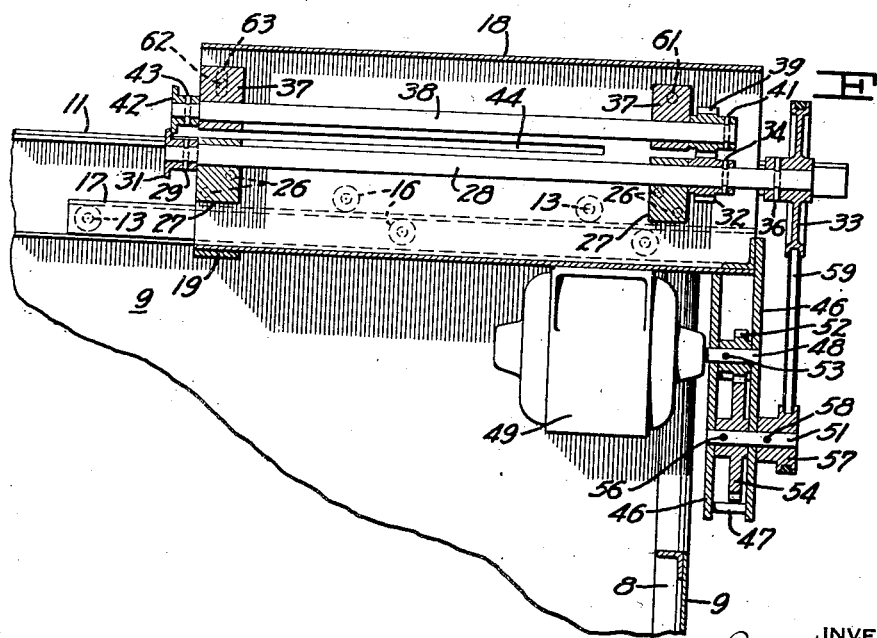
INVENTOR
Raymond H. Peterson
BY
Harry Schroeder Patented Apr. 27, 1943

2,317,553

UNITED STATES PATENT OFFICE 2,317,553

POWER SHEAR

Raymond H. Peterson, Hayward, Calif.

Application December 12, 1941, Serial No. 422,649

5 Claims. (Cl. 164—60)

This invention relates to mechanisms for shearing sheet material.

It is an object of the invention to provide an improved shear of the rotary cutter type.

Another object of the invention is to provide, in a power shear, an adjustable carriage-supported cutter head which may be quickly positioned to cut sheet material into strips of the desired width.

A further object of the invention is to provide a simple, efficient and inexpensive machine of the character described.

The invention possesses other objects and features of advantage which, in addition to the foregoing, will be specifically pointed out in the detailed description of the invention hereunto annexed; reference being now had to the accompanying drawings in which:

Figure 1 is a top plan view of the power shear of my invention.

Figure 2 is a side elevational view of the structure shown in Figure 1.

Figure 3 is an end elevational view of the power shear.

Figure 4 is a fragmental vertical sectional view, to an enlarged scale, taken in the plane indicated by the line 4—4 of Figure 1.

In detail, the apparatus comprises a box-like stand having rectangular upper and lower angle iron frames 6 and 7 connected together by spaced, vertical, angle iron corner and intermediate posts 8, and fitted with a sheet metal covering 9. Plates 11, attached to the upper angle iron frame 6 and forming a horizontal table top, said plates being laterally spaced so that their opposite edges border a recessed well 12 which extends longitudinally and horizontally medially of the stand. Mounted within the well 12, and journaled on bolts 13 secured to the sides 14 thereof, are vertically and horizontally spaced pairs of rollers 16 which engage horizontally movable rails 17 mounted on and extending from the sides of a tubular slitter head 18. Secured to and extending from a side of the slitter head 18 is an arm 19 carrying, at its distal end, a nut 21 bored and threaded to receive a feed screw 22 whose opposite ends are journaled in bearings 23 mounted on the stand and which is fitted, at one end, with a crank 24 by means of which the feed screw may be manually rotated. Rotation of the feed screw will move the slitter head 18 longitudinally along the well 12, i. e. in a rectilinear path between the separated edges of the top plates 11.

Secured by screws 26 in and adjacent opposite ends of the slitter head 18 is a pair of lower bearing blocks 27 each being bored to receive and journal a lower cutter shaft 28 to one end of which is secured, by a taper pin 29 or otherwise, a rotary disk cutter 31, and on the other end of which is mounted a spur pinion 32 and a drive pulley 33. The pinion 32 and the pulley 33 are secured to and for rotation with the cutter shaft 28, respectively, by taper pins 34 and 36 or by any similar means. The shaft 28 is positioned so that the periphery of the disk cutter 31 extends only slightly above the table top plates 11. An upper pair of bearing blocks 37 is provided, spaced vertically above the bearing blocks 27 and bored to journal an upper cutter shaft 38 which is connected for counter-rotation with the lower cutter shaft by means of a pinion 39 secured to the shaft 38, by means of a taper pin 41 or the like, and meshing with the pinion 32. A rotary disk cutter 42 secured to the other end of the upper cutter shaft, by means of a taper pin 43 or its equivalent, is positioned engaging, and in radially overlapping relation with, the disk cutter 31. It will thus be seen that when the drive pulley 33 is rotated both cutter shafts and their respective disk cutters will be rotated synchronously together and in opposite directions so that if a sheet of material is fed between the cutters, at the point where they overlap, the portions of the sheet lying on each side of the path of travel thereof, with respect to the pair of cutters, will be sheared one from the other. To provide clearance for one portion of the sheet, the slitter head is provided with a pair of longitudinally extending slots 44 through which the sheet may pass.

Means is provided for driving the drive pulley 33. Mounted on and depending from the bottom of the slitter head 18 is a pair of bearing plates 46 maintained in spaced relation by a plurality of spacer studs 47 and provided with bores serving as journals for the shaft 48 of a motor 49, also mounted on the bottom of the slitter head, and for an intermediate shaft 51. A spur pinion 52 is secured to the motor shaft 48, by a taper pin 53 or otherwise, and meshes with a spur gear 54 secured by a pin 56 to the intermediate shaft 51. A pulley 57 is also secured, by a pin 58, to the intermediate shaft 51 and both of the pulleys 57 and 33 are peripherally grooved to tractionally receive a so-called V belt 59 which connects the pulleys for rotation together. When the motor 49 is energized torque will be transmitted from the shaft 48 thereof through the gears 52 and 54 and the belt 59, connecting the pulleys 33 and 57, to rotate the lower cutter shaft 28, the upper shaft 38 also being rotated due to its connection with the shaft 28 through the gears 32 and 39.

Means is provided for adjusting the upper rotary disk cutter 42. The upper bearing block 37, adjacent the end of the shaft 38 carrying the gear 39, is mounted in the slitter head for rocking movement, about an axis transverse to the axis of the shaft, by pivot screws 61, and the other bearing block 37 is provided with clamp screws 62 which operate in elongated slots 63 formed in the vertical sides of the slitter head. By loosening the clamp screws 62, the upper cutter shaft 38 may be raised or lowered slightly to angular positions relative to the lower cutter shaft 28 so as to provide for a lesser or greater amount of radial overlap of the cutter disks 31 and 42. This adjustment is made each time a different thickness of stock is cut, the ideal setting being to make the degree of cutter overlap only slightly exceed the thickness of the sheet material thus reducing the angle of incidence of the cutter peripheries with the surface of the material to a minimum and permitting the cut to be made with the expenditure of as little power as possible.

So that the line along which the cut is being made in the sheet of material may be maintained parallel with one edge of the sheet, a guide fence consisting of an angle bar 64, which is attached to the side of the stand by screws 66, is provided. The screws 66 are preferably situated in elongated apertures in the vertical flange of the angle bar so that the fence, by loosening the screws, may be dropped below the upper surface of the table top thereby leaving the latter unobstructed in the event that extraordinarily large sheets of material are being worked upon.

A noteworthy feature of the power shear of my invention is that the adjustable slitter head, together with its motor and drive connections, is mounted as a unit to move along the recessed well thus eliminating all flexible shafts, universal joints and slip joint connections which would be present if a drive mounted stationary on some other portion of the stand were used.

Having thus described my invention in detail, what I claim as new and desire to secure by Letters Patent is:

1. A power shear comprising a stand having a table top provided with a recessed well extending therealong, guides in said well, a slitter head mounted in said well and provided with rails movably engaging the said guides, a feed screw journaled on said stand and paralleling the path of movement of said slitter head, an arm mounted on said slitter head and extending toward said feed screw, a nut carried by said arm and threadedly engaging said feed screw, a pair of parallel cutter shafts journaled in said slitter head, disk cutters mounted on said cutter shafts and positioned in radially overlapped relationship, gearing connecting said cutter shafts for counter-rotation together, means for angularly moving one of said cutter shafts relative to the other of the cutter shafts, a motor carried by said slitter head, bearing plates mounted on said slitter head, an intermediate shaft journaled in said bearing plates, gearing connecting said motor to rotate said intermediate shaft, pulleys on said intermediate shaft and on one of said cutter shafts, and an endless belt tractionally engaging said pulleys.

2. A power shear comprising a stand having a table top provided with a recessed well extending therealong, guides in said well, a slitter head mounted in said well and provided with rails movably engaging the said guides, a feed screw journaled on said stand and paralleling the path of movement of said slitter head, an arm mounted on said slitter head and extending toward said feed screw, a nut carried by said arm and threadedly engaging said feed screw, an horizontally spaced pair of fixed lower bearing blocks mounted in said slitter head, a superposed pair of upper bearing blocks in said slitter head, one of said upper bearing blocks being pivotally mounted in the slitter head and the other upper bearing block being movable in an arc centered at the pivot of said pivotally mounted bearing block, cutter shafts journaled in said upper and lower bearing blocks, said cutter shafts at one end thereof being provided with disk cutters positioned in radially overlapped relationship and, at the other end thereof, with intermeshed spur gears, one of said cutter shafts further being provided with a drive pulley, a motor carried by said slitter head, a pair of bearing plates secured to and extending from said slitter head, an intermediate shaft journaled in said bearing plates, gearing mounted, respectively, on the shaft of said motor and said intermediate shaft connecting said intermediate shaft to be driven by said motor, a pulley on said intermediate shaft, and a belt tractionally engaging said intermediate shaft pulley and said drive pulley of the cutter shaft whereby said cutter and intermediate shafts are connected for rotation together.

3. A power shear of the character described having in combination a stand provided with laterally spaced top plates bordering a recessed well, guide means within said well below said top plates, a tubular slitter head having rails movably engaging said guide means, said slitter head being positioned for rectilinear movement within the space between the opposite edges of said top plates, a pair of radially overlapped disk cutters journaled within said tubular slitter head, means on the slitter head for rotating said cutters, and means for imparting rectilinear movements to the slitter head.

4. A power shear of the character described having in combination a stand provided with a recessed well, a tubular slitter head mounted within said well, a pair of disk cutter shafts rotatively mounted within the tubular slitter head, radially overlapped disk cutters carried by said shafts, means carried by the tubular slitter head for rotating said cutter shafts, and means for imparting rectilinear movements to said tubular slitter head within said recessed well.

5. A power shear of the character described having in combination a stand provided with a recessed well, a tubular slitter head movably mounted within said well, a pair of disk cutter shafts rotatively mounted within said tubular slitter head, radially overlapped disc cutters carried by said cutter shafts, one of said shafts being pivotally mounted within said tubular slitter head whereby it may be adjusted relative to the other shaft, means carried by the slitter head for imparting rotation to said cutter shafts, and means for imparting rectilinear movements to said tubular slitter head within said recessed well.

RAYMOND H. PETERSON.